(12) United States Patent
Schrepfer et al.

(10) Patent No.: US 8,004,129 B2
(45) Date of Patent: Aug. 23, 2011

(54) ELECTRICAL MACHINE HAVING AN APPARATUS FOR AVOIDING DAMAGING BEARING CURRENTS, AND A CORRESPONDING METHOD

(75) Inventors: Armin Schrepfer, Grossenseebach (DE); Andreas Binder, Riedstadt-Goddelau (DE); Jürgen Wolf, Münzenberg (DE)

(73) Assignee: Siemens Aktiengesellschaft, München (DE)

( * ) Notice: Subject to any disclaimer, the term of this patent is extended or adjusted under 35 U.S.C. 154(b) by 542 days.

(21) Appl. No.: 12/279,804

(22) PCT Filed: Jan. 11, 2007

(86) PCT No.: PCT/EP2007/050232
§ 371 (c)(1),
(2), (4) Date: Aug. 18, 2008

(87) PCT Pub. No.: WO2007/093465
PCT Pub. Date: Aug. 23, 2007

(65) Prior Publication Data
US 2009/0015112 A1    Jan. 15, 2009

(30) Foreign Application Priority Data

Feb. 17, 2006 (DE) .................. 10 2006 007 437

(51) Int. Cl.
*H02K 5/16* (2006.01)
*H02K 11/00* (2006.01)

(52) U.S. Cl. .......... 310/68 R; 310/90; 384/476; 384/624

(58) Field of Classification Search ................. 310/68 R, 310/90; 384/476, 624
See application file for complete search history.

(56) References Cited

U.S. PATENT DOCUMENTS

| 3,677,072 | A | * | 7/1972 | Weichbrodt et al. | 73/593 |
| 7,736,062 | B2 | * | 6/2010 | Hagshenas et al. | 384/428 |
| 7,848,122 | B2 | * | 12/2010 | Tallam et al. | 363/39 |
| 2004/0189115 | A1 | | 9/2004 | Preisinger et al. | |
| 2005/0285464 | A1 | * | 12/2005 | Orders et al. | 310/88 |
| 2007/0182357 | A1 | | 8/2007 | Schrepfer | |
| 2009/0015112 | A1 | * | 1/2009 | Binder et al. | 310/68 R |

FOREIGN PATENT DOCUMENTS

DE          20007714 U1     9/2001
(Continued)

OTHER PUBLICATIONS

Machine translation of JP 10014159 A Mar. 1, 2011.*

(Continued)

*Primary Examiner* — Quyen Leung
*Assistant Examiner* — David W. Scheuermann
(74) *Attorney, Agent, or Firm* — Henry M. Feiereisen; Ursula B. Day

(57) ABSTRACT

The aim is to avoid damaging lubricating-film discharges occurring via bearings (WL) in electrical machines. For this reason, provision is made for a current to be forced to flow through the bearing (WL) specifically, with the aid of a current source (IQ). The current then flows from one of the two bearing components via the lubricating film to the other bearing component. Alternating currents are particularly suitable since the lubricating film is conductive, so that the capacitance defined by the lubricating film cannot be charged, or can be charged only slightly.

17 Claims, 3 Drawing Sheets

FOREIGN PATENT DOCUMENTS

| | | |
|---|---|---|
| DE | 20301956 U1 | 6/2004 |
| DE | 102004016738 B3 | 11/2005 |
| EP | 1445850 A1 | 8/2004 |
| GB | 2377037 A | 12/2002 |
| JP | 6096150 A | 4/1994 |
| JP | 10014159 A * | 1/1998 |
| WO | WO 2004082979 A1 | 9/2004 |
| WO | WO 2005099071 A1 | 10/2005 |

OTHER PUBLICATIONS

"Inverter-Driven Induction Motors Shaft and Bearing Current Solutions—Mar. 11, 2002" Industry White Paper, Rockwell Automation, Jun. 14, 2002, p. 1-45; Others.

Lienesch, F.: "Umrichtergespeiste elektrische Antriebe" Ex-Zeitschrift 2003, R.Stahl Schaltgergte GmbH, Waldenburg, p. 31-37; Others.

* cited by examiner

ELECTRICAL MACHINE HAVING AN APPARATUS FOR AVOIDING DAMAGING BEARING CURRENTS, AND A CORRESPONDING METHOD

BACKGROUND OF THE INVENTION

The present invention relates to an apparatus for avoiding damaging bearing currents in an electrical machine, and to an electrical machine which is equipped with an apparatus such as this. The present invention also relates to a corresponding method for avoiding damaging bearing currents.

The aim is to avoid lubricating film discharges in bearings, as far as possible, such as those which can occur in steam or gas turbine rotors on bearings. Specifically, the friction of the fluid jet on the blades in these rotors results in electrostatic charging. Furthermore, the bearings of gearboxes, piston engines or other mechanical rotating machines are also intended to be protected. In addition, one aim is in principle to avoid damaging bearing currents in variable rotation speed machines.

Variable rotation speed motors are nowadays generally fed from voltage intermediate-circuit converters. The use of a voltage intermediate-circuit converter for feeding leads to bearing currents in the motor bearings. These bearing currents can lead to premature failure of the bearings, depending on the design of the motor. The failure is due to groove formation on the running surfaces of the bearing (vibration, noise) and to decomposition of the bearing grease.

In order to suppress bearing currents, so-called circulating currents, current-insulating bearings are frequently used, for example bearings with ceramic insulation of the outer ring or inner ring. Alternatively, hybrid bearings are used, with steel rings and ceramic roller bodies, in order to avoid circulating currents and EDM currents. However, these bearings are very expensive and are therefore avoided as much as possible. In addition, solutions for avoiding bearing currents are known in which the rotor is grounded by means of grounding brushes. However, the grounding brushes are subject to wear, and the contacts are not reliable, particularly in rough environmental conditions. In addition, in an "Industry White Paper" entitled "Inverter-Driven Induction Motors Shaft and Bearing Current Solutions", the Rockwell Company have proposed that specific shielding be provided between the rotor and stator. In addition, converters with specific pulse patterns to reduce the bearing currents are also known for this purpose. All these solutions have the common feature that they are relatively expensive and complex.

SUMMARY OF THE INVENTION

The object of the present invention is therefore to propose an electrical machine in which the problems of bearing currents are solved in a simple manner. A further aim is to specify a corresponding method.

According to the invention, this object is achieved by an electrical machine having a first active part, a second active part which magnetically interacts with the first active part and a bearing device, by means of which the active parts are borne on one another, with the first active part being connected to a first bearing component, with the second active part being connected to a second bearing component, and with a lubricating film separating the two bearing components from one another, as well as a current source which is connected directly or indirectly to the bearing device such that a specific current can be passed from one bearing component to the other via the lubricating film. In the present document, the word "active part" means a stator or rotor of a rotating electrical machine, or else the primary part or secondary part of a linear motor.

Furthermore, the invention provides a method for avoiding damaging bearing currents in a bearing in an electrical machine, whose two bearing components which move with respect to one another are separated from one another by a lubricating film, by a specific current being applied, which flows from one of the two bearing components via the lubricating film to the other bearing component.

Passing a current through the lubricating film according to the invention makes it possible to use commercially available bearings in electrical machines where expensive hybrid bearings have been required until now. The life of the bearing is increased considerably, without the damaging bearing current.

In one preferred embodiment of the present invention, the electrical machine has a housing to which one of the two active parts is electrically connected, with the current source being connected to the housing in order to introduce the current into the bearing device. By way of example, this makes it possible to retrofit an electrical machine with a current source according to the invention, without having to modify the interior of the electrical machine.

The current source preferably applies an alternating current to the bearing device, whose frequency should be more than 9 kHz, for effectiveness reasons. This allows the electrical characteristics of the lubricating film to be effectively influenced such that a certain conductivity is ensured, which allows discharging.

The electrical machine preferably has a regulator device by means of which the current source can be controlled such that the electrical voltage between the two bearing components is essentially zero. This makes it possible to ensure that the current passed through the lubricating film is sufficiently high, but is not so high that the lubricating film is replaced.

The current source can be electrically connected to the bearing device without making contact. This has the advantage that the moving active part need not make contact with a specific contact device, for example contact brushes. In a further advantageous embodiment of the present invention, the current source is connected to the bearing device within the housing. This means that the current source and its contact devices can also be protected against environmental influences.

The current source advantageously draws its energy from the terminal voltage of the motor. There is therefore no need for any special power supply in order to pass current through the bearing.

The current source according to the invention can also be integrated in a motor transmitter. This allows the entire drive electronics for the electrical machine to be combined in a compact form.

BRIEF DESCRIPTION OF THE DRAWING

The present invention will now be explained in more detail with reference to the attached drawings, in which.

DETAILED DESCRIPTION OF PREFERRED EMBODIMENTS

The exemplary embodiments which are described in more detail in the following text represent preferred embodiments of the present invention. In principle, the present invention can be used for any type of electrical machines in which active parts move with respect to one another and the active parts are borne on one another. Advantages result in particular in the case of rotating electrical machines, irrespective of whether they are rotor-fed or stator-fed, and irrespective of whether they are fed with alternating current or direct current.

Figure 1:
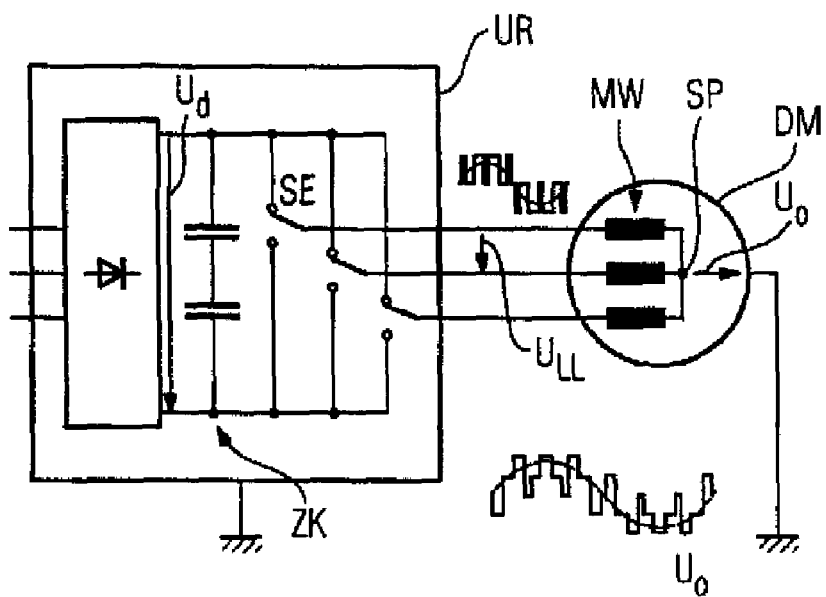
FIG. 1 shows a circuit diagram of a motor which is supplied with a voltage intermediate-circuit converter in a two-point circuit.

The reason for converter-dependent bearing currents is the so-called "common mode voltage" in the pulse pattern of the voltage intermediate-circuit converter UR, as is illustrated in FIG. 1. The common mode voltage $U_0$ applied to the motor DM can be measured directly, for example between the star point and the motor housing when the motor windings are connected in star. The electronic switching elements SE in the voltage intermediate-circuit converter UR connect the voltage $U_d$ from the intermediate circuit ZK to the motor windings MW using a control method. A distinction is drawn between so-called on-line and off-line control methods. Irrespective of the control method that is used, this results in a basic voltage profile $U_0$ at the star point SP as shown in FIG. 1. This voltage profile results from the voltages $U_{LL}$, which are likewise shown in FIG. 1, between the phases.

Figure 2:
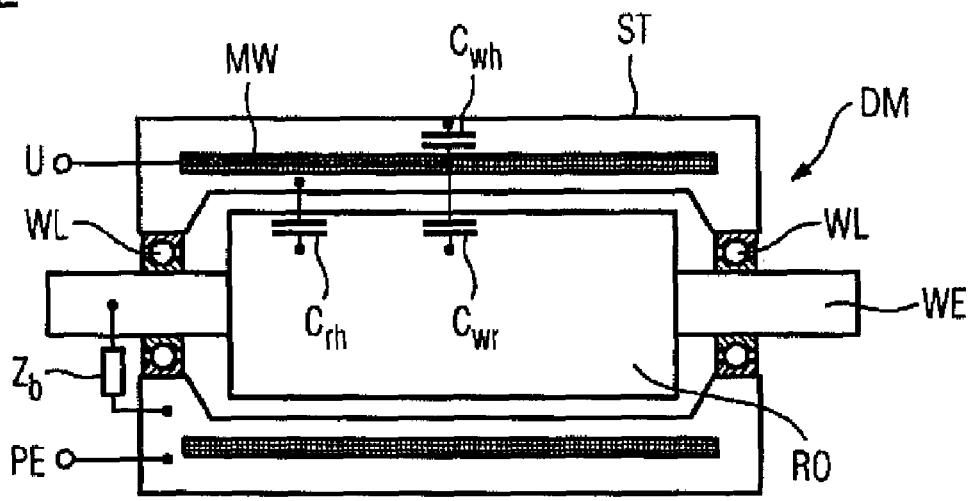
FIG. 2 shows a section drawing through a motor.

The process of switching the electronic switching elements SE on and off leads to a change in the voltage across the parasitic capacitances in the motor, and therefore to a current flow. FIG. 2 shows these parasitic capacitances in a stator-fed three-phase motor DM which has a stator ST and a rotor RO. The shaft WE of the rotor RO is borne on the stator ST, for example via roller bearings WL. The voltage U is applied to the windings WI of the stator ST.

This motor design (see also FIG. 3) leads to a capacitance $C_{wh}$ between the motor winding and the motor housing, a capacitance $C_{wr}$ between the motor winding and the rotor, a capacitance $C_{rh}$ between the rotor and the motor housing, an effective capacitance $C_b$ between the roller bodies and the bearing rings, a non-linear impedance $Z_n$ of the lubricating film and an effective resistance, $R_b$ of the bearing, comprising the bearing rings and roller bodies.

Figure 3:
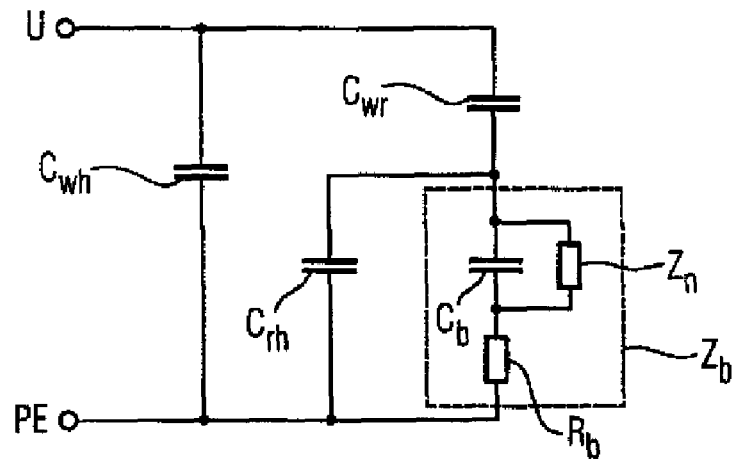
FIG. 3 shows a single-phase equivalent circuit of the motor shown in FIG. 2.

The single-phase equivalent circuit of a three-phase motor as shown in FIG. 3 and including the electrical equivalent circuit for the impedance $Z_b$ of the roller bearing WL results from these electrical variables. The capacitance $C_{wh}$ is accordingly located between the phase U and ground PE. A series circuit formed by the capacitances $C_{wr}$ and $C_{rh}$ is arranged in parallel with this capacitance $C_{wh}$. The bearing impedance $Z_b$ is once again located in parallel with the capacitance $C_{rh}$. This bearing impedance $Z_b$ comprises the capacitance $C_b$ and the lubricating film impedance $Z_n$, which is connected in series with the bearing resistance $R_b$, being connected in parallel.

Figure 4:
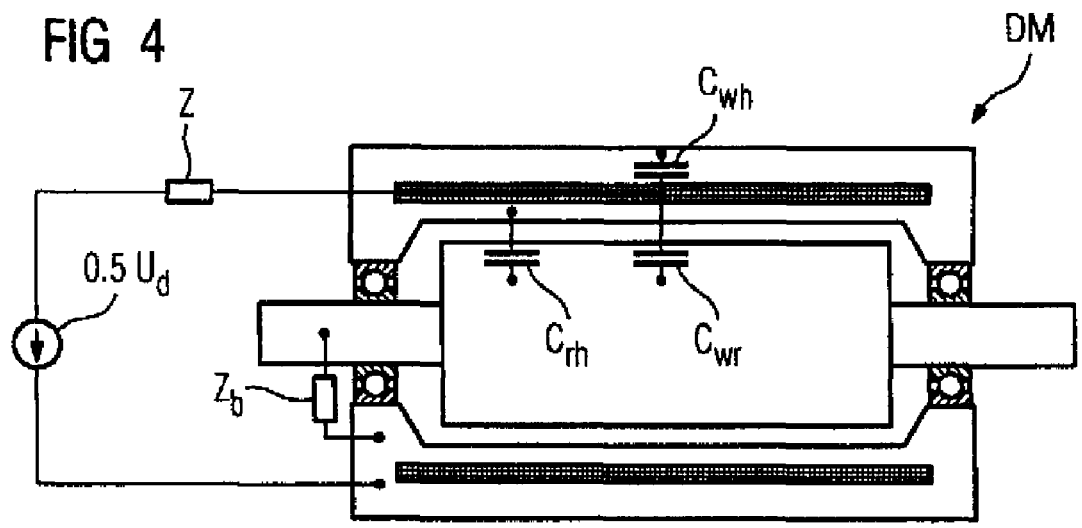
FIG. 4 shows the motor from FIG. 2 with the electrical circuitry.
Figure 5:
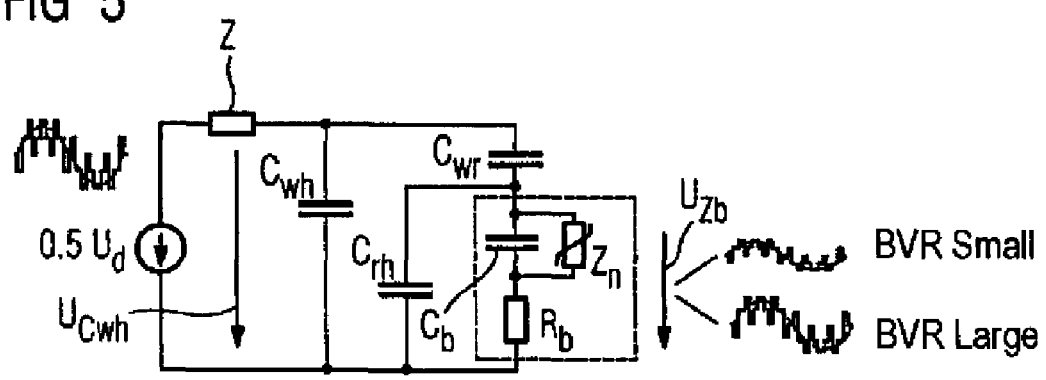
FIG. 5 shows the equivalent circuit, corresponding to the circuitry in FIG. 4, with bearing current signal forms.

Damaging bearing currents can occur as a result of discharge effects. In this case (see FIG. 4 and FIG. 5), the capacitance of the roller bearing $C_b$ is charged via the capacitive voltage divider formed from $C_{wr}$, $C_{rh}$ and $C_b$, provided that the lubricating film can insulate this voltage. On reaching the breakdown voltage, the capacitance $C_b$ is short-circuited within the bearing, and the capacitance $C_{rh}$ is discharged into this short circuit. As long as the lubricating film provides insulation, the voltage across the bearing is a map of the common mode voltage, corresponding to the bearing voltage ratio BVR, which is predetermined by the motor design.

Figure 7:
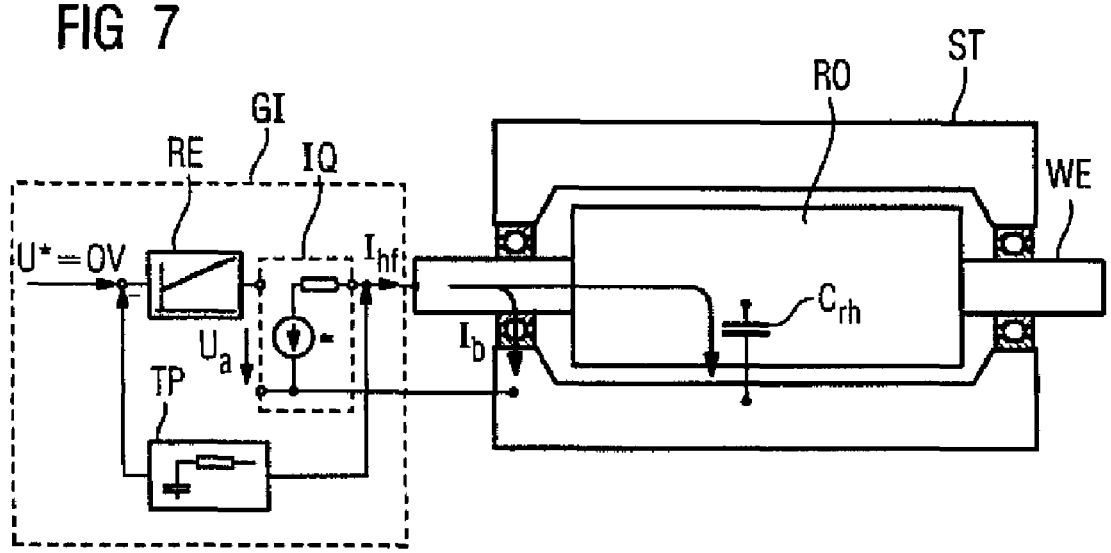
FIG. 7 shows the motor from FIG. 6, with a regulated current source.

The bearing voltage ratio BVR is given by the ratio of the voltage $U_{Zb}$ across the bearing impedance $Z_b$ and the voltage $U_{cwh}$ across the capacitance $C_{wh}$. This ratio is typically between 0.02 and 0.2. FIG. 7 shows the waveform of the voltage $U_{Zb}$ for a low value of BVR and for a high value of BVR. In this case, the circuit or the motor winding is supplied via an impedance Z with half the intermediate-circuit voltage $0.5\ U_d$, with the same signal waveform as the voltage $U_{Zb}$.

Figure 6:
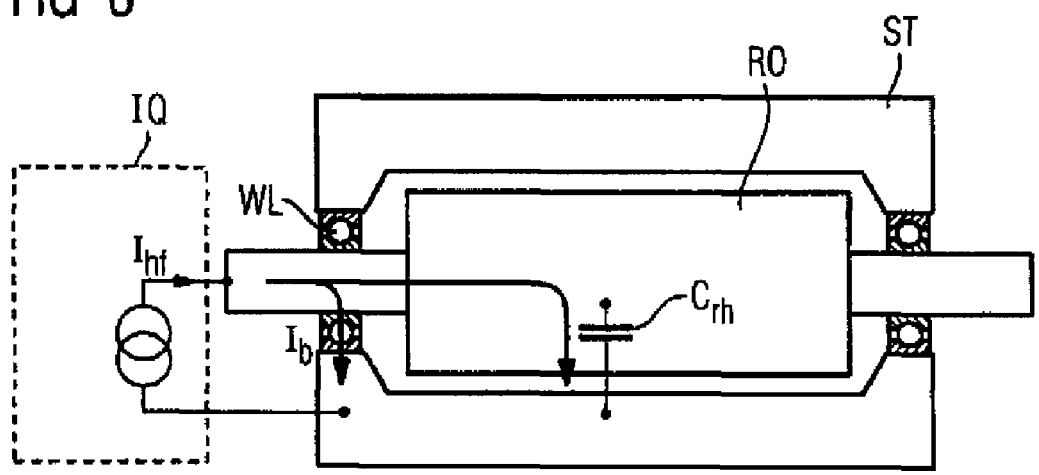
FIG. 6 shows the circuitry according to the invention for a motor with a current source between the shaft and housing.

Current $I_b$ which causes no damage to the bearing WL is injected by means of a circuit IQ according to the invention as illustrated in FIG. 6, and breaks through the lubricating film on the bearing WL. In this case, the lubricating film forms the capacitance $C_b$ mentioned in conjunction with FIGS. 3 and 5. The current $I_{hf}$ produced by the current source IQ therefore flows as a bearing current $I_b$ via the bearing WL, that is to say the capacitance $C_b$, however, proportionally, also flows via the capacitance $C_{rh}$ between the machine rotor RO and the housing or stator ST.

The current $I_b$ produces a short in the lubricating film and prevents charging of the capacitance $C_b$. This prevents bearing-internal lubricating film discharge currents, and the bearing voltage ratio becomes virtually zero. The injected current $I_{hf}$ is preferably a radio-frequency current at a frequency of more than 9 kHz. However, this preferred frequency may vary with the composition of the lubricating film.

The current source IQ not only feeds the current through the lubricating film of the bearing WL but also absorbs the energy which is injected via the capacitance $C_{wr}$ as a result of the switching processes in the frequency converter (not illustrated). In addition, it should be added that the current source may also be in the form of a voltage source with an internal resistance.

Corresponding to one particularly preferred embodiment of the invention, FIG. 7 shows a regulator RE setting the current from the source IQ which is controlled in this case, such that the bearing voltage $U_{zb}$ is regulated at zero despite the energy injected via the capacitance $C_{wr}$. The actual value of the regulator RE is, for example, tapped off via a low-pass filter TP from the output of the source or directly on the rotor RO, and the output voltage $U_a$ from the regulator RE controls the magnitude of the current $I_{hf}$. This results in a regulated current source GI in order to avoid damaging bearing currents.

The source IQ is coupled to the rotor RO via contacts, for example slip rings, or without contacts, by means of a suitable coupling device, for example an antenna. The radio-frequency current source may be connected at any desired point on the rotor RO, either within the rotor in order to minimize the radiated emission of RF signals, or externally to the motor shaft WE.

The energy for operation of the radio-frequency current source IQ may be obtained from the terminal voltage of the motor. Alternatively, the radio-frequency current source can also be obtained from a specific power supply, for example 24 V DC. The entire circuit to produce the current flow, in this case the regulated current source GI or the simple current source IQ, may also be a component of a motor transmitter, or may be designed as such.

What is claimed is:

1. An electrical machine comprising:
 a first active part;
 a second active part which magnetically interacts with the first active part;
 a bearing device by which one of the active parts is borne on the other active part, the first active part being connected to a first bearing component, the second active part being coupled to a second bearing component, and with a lubricating film separating the first and second bearing components from one another; and
 a current source coupled to the bearing device, said current source being adapted to apply a specific current from the first bearing component to the second bearing component via the lubricating film so that the conductivity of said lubricating film is sufficient to permit a discharge of one bearing component to the other bearing component via the lubricating film.

2. The electrical machine of claim 1 wherein the current source is directly connected to the bearing device.

3. The electrical machine of claim 1 wherein the current source is indirectly coupled to the bearing device.

4. The electrical machine of claim 1 further comprising a housing, one of said two active parts of the bearing device being electrically connected to the housing and said current source being connected to the housing so as to apply the specific current to the bearing device.

5. The electrical machine of claim 1 wherein the current source applies an alternating current to the bearing device.

6. The electrical machine of claim 5 wherein the frequency of the alternating current applied to the bearing device is higher than 9 kHz.

7. The electrical machine of claim 1 further comprising a control device, said control device being adapted to control said current source so that the electrical voltage between the two bearing components is substantially zero.

8. The electrical machine of claim 1 wherein the current source is electrically coupled to the bearing device without making contact.

9. The electrical machine of claim 4 wherein the current source is connected to the bearing device within the housing.

10. The electrical machine as of claim 1 wherein the current source draws its energy from the terminal voltage of the electrical machine.

11. The electrical machine as of claim 1 wherein the current source draws its energy from a DC power source.

12. The electrical machine of claim 1 wherein the current source includes means for supplying a current that produces the specific current applied from the first bearing component to the second bearing component via the lubricating film, said electrical machine further comprising a motor transmitter, the means for supplying said current that produces the specific current being integrated in the motor transmitter.

13. The electrical machine of claim 1 wherein the current source includes means for applying a current that produces the specific current that is applied from the first bearing component to the second bearing component via the lubricating film, said electrical machine further comprising a rotor in the bearing device, said means for applying the current that produces the specific current being located within the rotor.

14. A method for avoiding damaging bearing currents in a bearing in an electrical machine, the electrical machine having two bearing components which move with respect to one another, said method comprising the steps of:
 providing a lubricating film between the two bearing components, the lubricating film separating the two bearing components from one another; and
 applying a specific current to the bearing device from one bearing component via the lubricating film to the other bearing component so that the conductivity of said lubricating film is sufficient to permit one bearing component to discharge to the other bearing component via the lubricating film.

15. The method of claim 14, wherein an alternating current is applied to the two bearing components.

16. The method of claim 14, wherein the frequency of the alternating current is higher than 9 kHz.

17. The method of claim 14, wherein the applied current is controlled so that the electrical voltage between the two bearing components is substantially zero.

* * * * *